(12) United States Patent
Bunker (10) Patent No.: US 10,436,068 B2
(45) Date of Patent: Oct. 8, 2019

(54) FLOWPATH CONTOURING

(71) Applicant: General Electric Company, Schenectady, NY (US)

(72) Inventor: Ronald Scott Bunker, West Chester, OH (US)

(73) Assignee: General Electric Company, Schenectady, NY (US)

(*) Notice: Subject to any disclaimer, the term of this patent is extended or adjusted under 35 U.S.C. 154(b) by 323 days.

(21) Appl. No.: 15/042,568

(22) Filed: Feb. 12, 2016

(65) Prior Publication Data
US 2017/0234161 A1    Aug. 17, 2017

(51) Int. Cl.
*F01D 25/24*   (2006.01)
*F01D 9/04*    (2006.01)
*F02C 3/04*    (2006.01)

(52) U.S. Cl.
CPC ............. *F01D 25/24* (2013.01); *F01D 9/04* (2013.01); *F01D 9/044* (2013.01); *F02C 3/04* (2013.01); *F05D 2220/32* (2013.01); *F05D 2230/30* (2013.01); *F05D 2260/60* (2013.01)

(58) Field of Classification Search
CPC . F01D 25/14; F01D 25/24; F02C 7/12; F05D 2260/60; F05D 2250/61; F05D 2250/611; F05D 2250/73
See application file for complete search history.

(56) References Cited

U.S. PATENT DOCUMENTS

| | | | |
|---|---|---|---|
| 4,305,248 A | 12/1981 | Wright | |
| 5,466,123 A * | 11/1995 | Rose | F01D 5/143 415/182.1 |
| 7,465,155 B2 * | 12/2008 | Nguyen | F01D 5/143 415/191 |
| 8,205,458 B2 * | 6/2012 | Lee | F01D 9/041 415/115 |
| 8,684,684 B2 * | 4/2014 | Clements | F01D 9/041 415/193 |

(Continued)

FOREIGN PATENT DOCUMENTS

| | | |
|---|---|---|
| CN | 102200034 A | 9/2011 |
| CN | 104662274 A | 5/2015 |

(Continued)

OTHER PUBLICATIONS

Extended European Search Report and Opinion issued in connection with corresponding EP Application No. 17155203.7 dated Jul. 7, 2017.

(Continued)

*Primary Examiner* — Steven M Sutherland
(74) *Attorney, Agent, or Firm* — Dority & Manning, P.A.

(57) ABSTRACT

A gas turbine engine includes a compressor section, combustion section, and turbine section. The turbine section includes a turbine component stage, the turbine component stage including a plurality of turbine components together including a flowpath surface along a circumferential direction of the gas turbine engine. The flowpath surface defines in part a core air flowpath of the gas turbine engine and further defines a contour along the circumferential direction. The contour repeats less frequently than once per turbine component to accommodate a hot gas streak through the turbine section.

14 Claims, 6 Drawing Sheets

(56) References Cited

U.S. PATENT DOCUMENTS

| | | |
|---|---|---|
| 8,884,182 B2 | 11/2014 | Lee et al. |
| 2003/0002975 A1 | 1/2003 | Dudebout et al. |
| 2011/0135952 A1 | 6/2011 | Morris et al. |
| 2011/0236200 A1* | 9/2011 | Grover ............... F01D 9/02 |
| | | 415/208.1 |
| 2013/0017095 A1* | 1/2013 | Lee ................. F01D 5/081 |
| | | 416/239 |
| 2014/0286773 A1* | 9/2014 | Okita ............... F01D 5/186 |
| | | 416/95 |
| 2014/0301852 A1 | 10/2014 | Zscherp |
| 2014/0318141 A1 | 10/2014 | Bartz et al. |
| 2015/0003995 A1 | 1/2015 | Xu |
| 2016/0332251 A1 | 11/2016 | Bunker et al. |

FOREIGN PATENT DOCUMENTS

| | | |
|---|---|---|
| EP | 2 532 962 A2 | 12/2012 |
| EP | 2 570 595 A1 | 3/2013 |

OTHER PUBLICATIONS

Machine Translation and First Office Action and Search issued in connection with corresponding CN Application No. 201710074291.2 dated Jun. 26, 2018.

* cited by examiner

FLOWPATH CONTOURING

FIELD OF THE INVENTION

The present subject matter relates generally to a contouring of a hot gas path in a gas turbine engine.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

The combustion section typically includes a plurality of individual fuel nozzles. The plurality of individual fuel nozzles are circumferentially spaced and configured for injecting a fuel-air mixture to be burned within a combustion chamber. Although designed to create a substantially homogenous mixture of combustion gasses along the circumferential direction, typically, a location downstream of each fuel nozzle is hotter than other circumferential positions (sometimes referred to as "hot gas streaks").

Accordingly, when such flow is routed into the turbine section, the hot gas streaks may be hotter than other circumferential locations. In order to ensure the components within the turbine section are capable of withstanding the temperatures of the hot gas streaks, each of the components within the turbine section are designed and manufactured to accommodate these hot gas streaks. However, the inventor of the present disclosure has discovered that such an approach may lead to over engineering of certain components within the turbine section.

Accordingly, the inventor of the present disclosure has discovered that it may be beneficial for components within the gas turbine engine to be designed according to their anticipated or actual location within the turbine section relative to the hot gas streaks extending therethrough during operation. More specifically, the inventor of the present disclosure has discovered that it may be beneficial to design components within a given stage of turbine components according to their anticipated or actual location relative to the hot gas streaks extending through the turbine section during operation.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a turbine component stage for a gas turbine engine is provided. The gas turbine engine defines a core air flowpath, an axial direction, and a circumferential direction. The turbine component stage includes a first turbine component including a first wall, the first wall including a hot side and defining in part the core air flowpath. The first wall is manufactured to include a contour along an entirety of the hot side. The turbine component stage additionally includes a second turbine component arranged adjacent to the first turbine component along the circumferential direction. The second turbine component includes a second wall, the second wall including a hot side and defining in part the core air flowpath. The second wall is also manufactured to include a contour along an entirety of the hot side, the contour along the hot side of the first wall being distinct from the contour along the hot side of the second wall to accommodate a hot gas streak from the combustion section.

In another exemplary embodiment of the present disclosure, a gas turbine engine defining an axial direction and a circumferential direction is provided. The gas turbine engine includes a compressor section, a combustion section, and a turbine section arranged in serial flow order and together at least partially defining a core air flowpath. The turbine section includes a turbine component stage, the turbine component stage including a plurality of turbine components together include a flowpath surface along the circumferential direction. The flowpath surface defines in part the core air flowpath and further defines a contour in the circumferential direction. The contour repeats less frequently than once per turbine component.

In another exemplary embodiment of the present disclosure, a method is provided for manufacturing two or more turbine components of a turbine component stage of a turbine of a gas turbine engine. The gas turbine engine defines a circumferential direction and a core air flowpath. The method includes casting a first turbine component including a first turbine component wall, the first turbine component wall including a hot side at least partially defining the core air flowpath when installed in the gas turbine engine. The hot side of the first turbine component wall defines a base contour along the circumferential direction. The method also includes casting a second turbine component including a second turbine component wall, the second turbine component wall including a hot side at least partially defining the core air flowpath when installed in the gas turbine engine. The hot side of the second component wall defines a base contour, the base contour of the hot side of the first turbine component wall being the same as the base contour of the hot side of the second turbine component wall. The method also includes modifying the base contour of the hot side of the first turbine component wall to be distinct from the base contour of the hot side of the second turbine component wall to allow the first turbine component to accommodate a hot gas streak through the turbine when installed in the gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
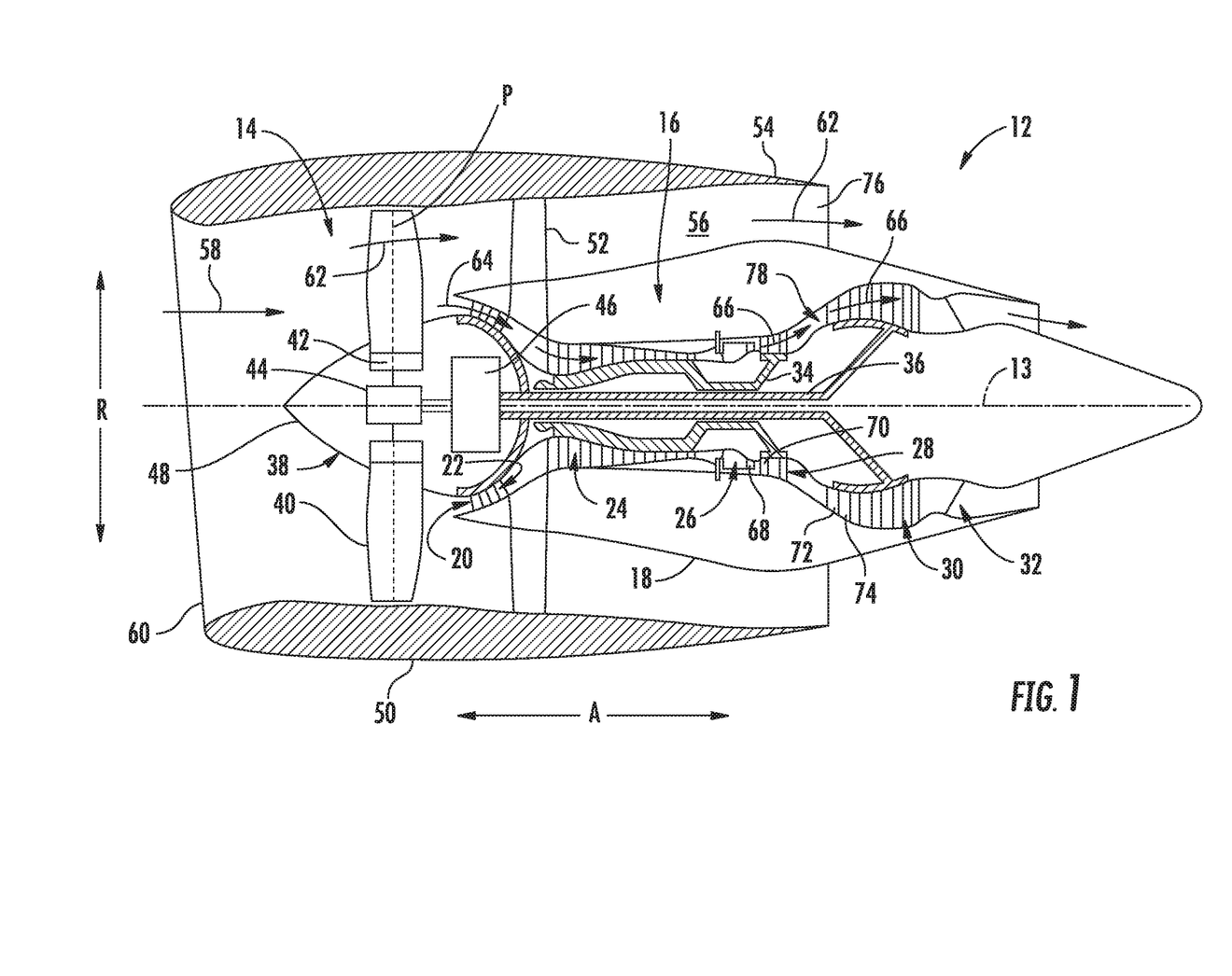
FIG. 1 is a schematic cross-sectional view of an exemplary gas turbine engine according to various embodiments of the present subject matter.

Referring now to the drawings, wherein identical numerals indicate the same elements throughout the figures, FIG. 1 is a schematic cross-sectional view of a turbomachine in accordance with an exemplary embodiment of the present disclosure. More particularly, for the embodiment of FIG. 1, the turbomachine is configured as a gas turbine engine, or rather as a high-bypass turbofan jet engine 12, referred to herein as "turbofan engine 12." As shown in FIG. 1, the turbofan engine 12 defines an axial direction A (extending parallel to a longitudinal centerline 13 provided for reference), a radial direction R, and a circumferential direction (not shown) extending about the axial direction A. In general, the turbofan 12 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases and the core turbine engine 16 includes, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Accordingly, the LP shaft 36 and HP shaft 34 are each rotary components, rotating about the axial direction A during operation of the turbofan engine 12.

Referring still to the embodiment of FIG. 1, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed. More particularly, the fan section includes a fan shaft rotatable by the LP shaft 36 across the power gearbox 46. Accordingly, the fan shaft may also be considered a rotary component, and is similarly supported by one or more bearings.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 12, a volume of air 58 enters the turbofan 12 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 12, also providing propulsive thrust. The HP turbine 28, the LP turbine 30, and the jet exhaust nozzle section 32 at least partially define a hot gas path 78 for routing the combustion gases 66 through the core turbine engine 16.

Figure 2:
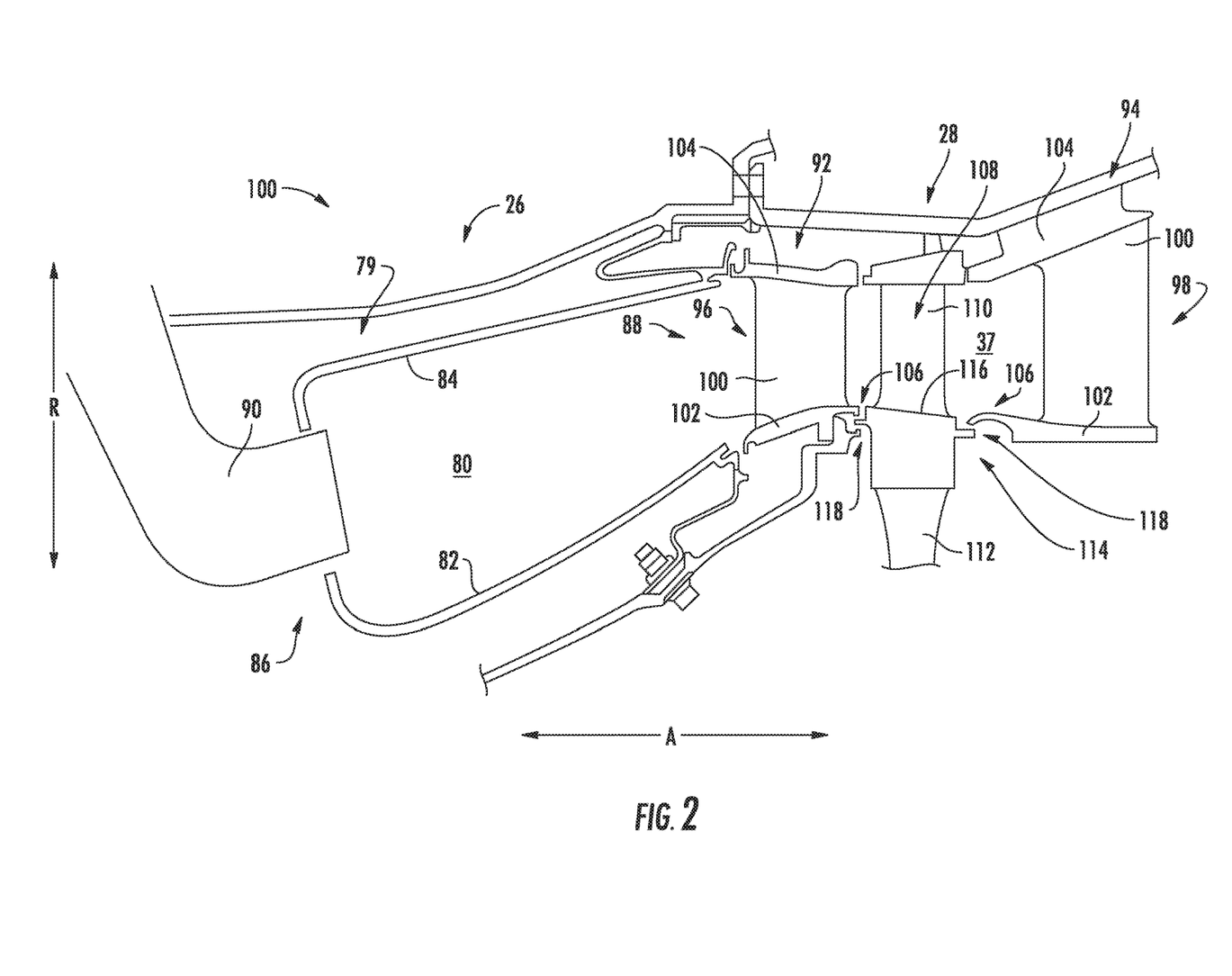
FIG. 2 is a close-up, side view of a combustion section and a portion of a turbine section of the exemplary gas turbine engine of FIG. 1.

Referring now to FIG. 2, a close-up, cross-sectional view is provided of the turbofan engine 12 of FIG. 1, and particularly of the combustion section 26 and the HP turbine 28 of the turbine section. The combustion section 26 depicted generally includes a combustor 79 including a combustion chamber 80 defined by an inner liner 82 and an outer liner 84, the combustion chamber 80 extending generally along the axial direction A from a forward end 86 to an aft end 88. A plurality of fuel nozzles 90 are positioned at the forward end 86 of the combustion chamber 80 for providing the combustion chamber 80 with a mixture of fuel and compressed air from the compressor section. As discussed above, the fuel and air mixture is combusted within the combustion chamber 80 to generate a flow of combustion gasses therethrough. For the embodiment depicted, the combustor 79 is configured as a cannular combustor. Specifically, the combustor 79 includes a plurality of fuel nozzles 90 spaced generally along the circumferential direction C (a direction extending about the axial direction A; see FIG. 3) and a single combustion chamber 80 having an annular shape also extending along the circumferential direction C.

Downstream of the combustion section 26, the HP turbine 28 includes a plurality of turbine component stages, each turbine component stage comprising a plurality of turbine components. More particularly, for the embodiment depicted, the HP turbine 28 includes a plurality of turbine nozzle stages, as well as one or more stages of turbine rotor blades. Specifically, for the embodiment depicted, the HP turbine 28 includes a first turbine nozzle stage 92 and a second turbine nozzle stage 94, each configured to direct a flow of combustion gasses therethrough. The first turbine nozzle stage 92 includes a plurality of turbine nozzle sections 96 spaced along the circumferential direction C. Notably, the first turbine nozzle stage 92 is located immediately downstream from the combustion section 26, and thus may also be referred to as a combustor discharge nozzle stage having a plurality of combustion discharge nozzle sections. Additionally, for the exemplary embodiment depicted, the second turbine nozzle stage 94 also includes a plurality of turbine nozzle sections 98 spaced along the circumferential direction C.

Each of the turbine nozzle sections 96, 98 forming the first and second turbine nozzle stages 92, 94 includes a turbine nozzle 100 (configured generally as an airfoil) positioned within the core air flowpath 37 and a wall defining at least in part the core air flowpath 37. More particularly, each nozzle section 96, 98 includes an inner endwall 102 and an outer endwall 104, with the nozzle 100 extending generally along the radial direction R from the inner endwall 102 to the outer endwall 104. For the embodiment depicted, the nozzle 100 is attached to or formed integrally with each of the inner endwall 102 and outer endwall 104. Further, each of the turbine nozzle sections 96, 98 includes a seal 106, the seal 106 also defining in part the core air flowpath 37, as will be discussed in greater detail below. It should be appreciated that as used herein, "defining in part the core air flowpath" refers to forming an inner boundary or barrier of the flowpath along the radial direction R, or forming an outer boundary or barrier for the flowpath along the radial direction R.

Located immediately downstream of the first turbine nozzle stage 92, i.e., the combustor discharge nozzle stage, and immediately upstream of the second turbine nozzle stage 94, the HP turbine 28 includes a first stage 108 of turbine rotor blades 110. The first stage 108 of turbine rotor blades 110 includes a plurality of turbine rotor blades 110 spaced along the circumferential direction C and a first stage rotor 112. The plurality of turbine rotor blades 110 each include a base 114 through which the respective turbine rotor blade 110 is attached to the first stage rotor 112. Although not depicted, the turbine rotor 112 is, in turn, connected to the HP shaft 34 (see FIG. 1). In such manner, the turbine rotor blades 110 may extract kinetic energy from the flow of combustion gasses through the core air flowpath 37 defined by the HP turbine 28 as rotational energy applied to the HP shaft 34.

Similar to the plurality of nozzles sections 96, 98 forming the first and second turbine nozzle stages 92, 94, the base 114 of each of the turbine rotor blades 110 includes a wall or platform 116 also defining at least in part the core air flowpath 37. Further, the platforms 116 also include a seal 118. The seal 118 of the platforms 116 are configured to interact with the seals 106 of the turbine nozzle sections 96, 98 forming the first and second turbine nozzle stages 92, 94 to prevent an undesired flow of combustion gasses from the core air flowpath 37 between the first stage 108 of turbine rotor blades 110 and the first and second turbine nozzle stages 92, 94.

Referring still to FIG. 2, and as previously discussed, the combustor 79 of the exemplary combustion section 26 depicted includes a plurality of fuel nozzles 90 spaced along the circumferential direction C. The combustion section 26 may be designed to mix the combustion gases within the combustion chamber 80 to generate a substantially homogenous temperature distribution along the circumferential direction C. However, such may be difficult due to the inclusion of a plurality of individual, circumferentially spaced combustor nozzles 90. Instead, the combustor 79 may generate "hot gas streaks" extending downstream from each of the combustor nozzles 90. The inventor of the present disclosure has determined that instead of designing and manufacturing each turbine component in a given stage of turbine components to withstand the relatively high temperatures of the hot gas streaks, it can be beneficial to design each turbine component in a respective stage of turbine components to withstand the particular temperatures anticipated for a given circumferential position of such turbine component. Accordingly, as is discussed below, the turbine section of the exemplary turbofan engine 12 depicted is configured to accommodate the hot gas streaks without requiring over engineering of each of the plurality of turbine nozzle sections 96.

Figure 3:
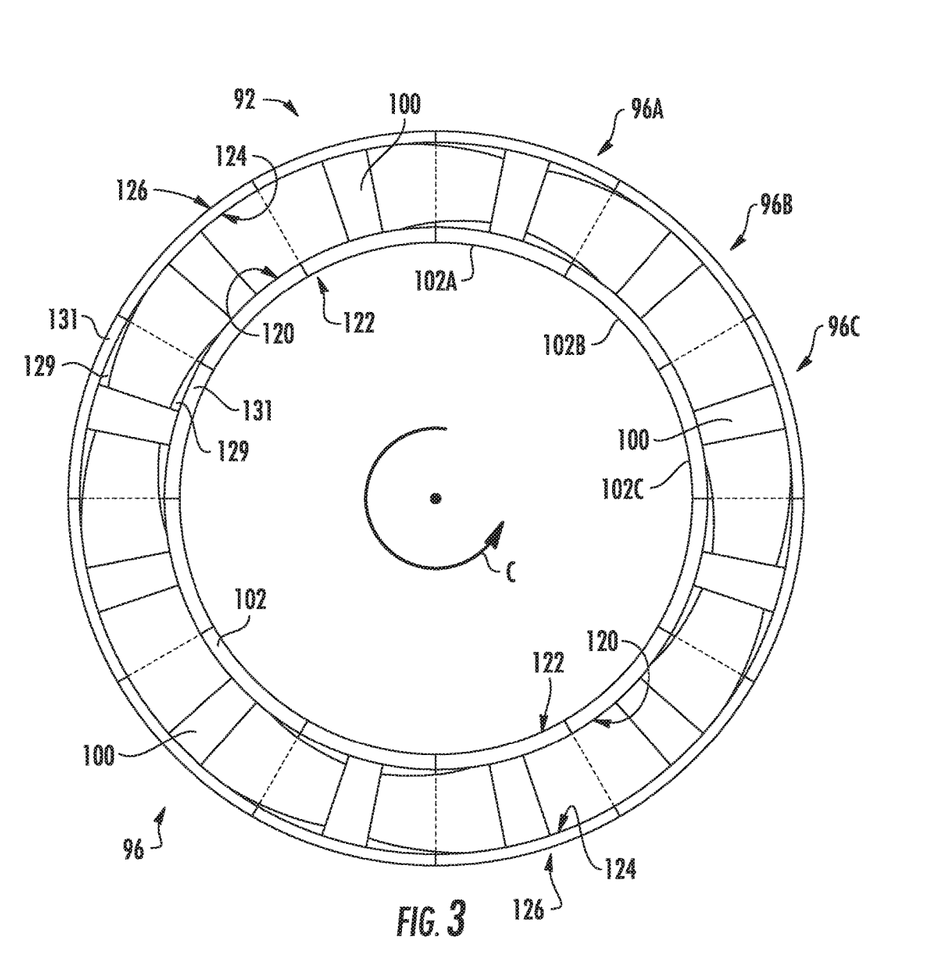
FIG. 3 is an axial view of a turbine nozzle stage of the turbine section of the exemplary gas turbine engine depicted in FIG. 2.
Figure 4:
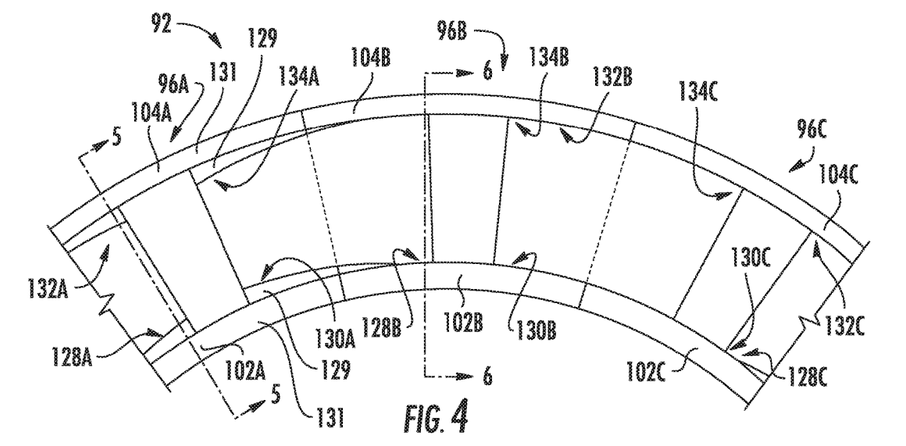
FIG. 4 is a close-up view of a portion of the exemplary turbine nozzle stage of FIG. 3.

Referring now to FIGS. 3 and 4, views are provided of a turbine component stage including a plurality of turbine components. Specifically, FIG. 3 provides a schematic, axial view of the exemplary turbine component stage, and FIG. 4 provides a close-up, schematic, axial view of the exemplary turbine component stage. As is depicted, the turbine component stage includes a plurality of turbine components, each including a wall defining in part the core air flowpath 37 and a blade or nozzle extending therefrom. For example, the exemplary turbine component stage depicted includes a first turbine component having a first wall defining in part the core air flowpath 37, a second turbine component having a second wall defining in part the core air flowpath 37, and a third turbine component having a third wall defining in part the core air flowpath 37. The second turbine component is arranged adjacent to the first turbine component along the circumferential direction C, and similarly, the third turbine component is arranged adjacent to the second turbine component along the circumferential direction C.

More particularly, for the embodiment depicted, the turbine component stage is configured as a first turbine nozzle stage 92, such as the exemplary first turbine nozzle stage 92 described above with reference to FIG. 2 (thus, the same or similar numbers may refer to the same or similar parts). As such, the first turbine component is a first turbine nozzle section 96A and the first wall is a first inner endwall 102A; the second turbine component is a second turbine nozzle section 96B and the second wall is a second inner endwall 102B; and the third turbine component is a third turbine nozzle section 96C and the third wall is a third inner endwall 102C. Further, as is depicted, the first turbine nozzle stage 92 additionally includes a plurality of additional turbine nozzle sections (referred to generally as "96") arranged along the circumferential direction C, each of the plurality of additional turbine nozzle sections 96 including an inner endwall (referred to generally as "102").

Referring first generally to the inner endwalls 102 of the plurality of turbine nozzle sections 96 depicted in FIG. 3, the inner endwalls 102 together define a flowpath surface 120 along the circumferential direction C and an opposite cold side surface 122. The flowpath surface 120 defines in part the core air flowpath 37. The flowpath surface 120 additionally defines a contour. For illustration purposes, a portion of the contour defined by the flowpath surface 120 extending along the circumferential direction C, i.e., about the axial direction A, is depicted if FIG. 3 and described below. However, as further explained below with reference to FIGS. 5 and 6, the contour defined by the flowpath surface 120 may refer to an entire contour of the flowpath surface 120 (i.e., extending in the circumferential direction C, as well as along the axial direction A).

Referring still to the embodiment depicted in FIG. 3, the endwalls 102 of each of the plurality of turbine nozzle sections 96 define a hot side 128 (see below). For the embodiment depicted, the flowpath surface 120 extends substantially continuously along the hot sides 128 of the endwalls 102 along the circumferential direction C between the respective turbine nozzles 100. Additionally, the contour is non-axisymmetric and further repeats less frequently than once per turbine nozzle section 96. For example, in the embodiment depicted, the exemplary turbine nozzle sections 96 are configured to accommodate four hot streaks from the combustion section 26. Accordingly, although the turbine nozzle stage includes 12 turbine nozzle sections 96, the contour defined by the flowpath surface 120 repeats only four times. Of course, in other exemplary embodiments, the turbine nozzle stage 92 may include any other suitable number of turbine nozzle sections 96, and may accommodate any other suitable number of hot gas streaks (i.e., the contour defined by the flowpath surface 120 may repeat any other suitable number of times). Additionally, in other exemplary embodiments, the contour defined by the flowpath surface 120 may not repeat at all and may include different configurations at each of the anticipated locations for the hot gas streaks. Accordingly, as used herein "repeats less frequently than once per turbine nozzle section" includes no repeats, i.e., repeating zero time.

Referring now particularly to FIG. 4, one such repeating section of the contour of the flowpath surface 120 is defined by the first turbine nozzle section 96A, the second turbine nozzle section 96B, and the third turbine nozzle section 96C. The inner endwalls 102A, 102B, 102C of the nozzle sections 96A, 96B, 96C each include a hot side 128A, 128B, 128C having a respective contour along an entirety of the respective hot sides 128A, 128B, 128C. Specifically, for the embodiment illustrated, the hot sides 128A, 128B, 128C include contours 130A, 130B, 130C, respectively. The contours 130A, 130B, 130C are defined along the circumferential direction C, and further, each of the contours 130A, 130B, 130C are located at the same position along the axial direction A.

The first turbine nozzle section 96A is located circumferentially within the first turbine nozzle stage 92 where an anticipated hot gas streak will occur. In order to accommodate such hot streak, the first, second, and third turbine nozzle sections 96A, 96B, 96C are each manufactured such that the contours extending along the entireties of the hot sides 128A, 128B, 128C of the inner endwalls 102A, 102B, 102C are distinct. Specifically, for the embodiment depicted, the nozzle sections 96A, 96B, 96C are each manufactured such that the contour 130A of the first inner endwall 102A is distinct from the contour 130B of the second inner endwall 102B, which is in turn distinct from the contour 130C of the third inner endwall 102C.

More particularly, for the embodiment depicted, the first inner endwall 102A is manufactured to include an additional material 129 added to a base material 131 to allow the first inner endwall 102A to accommodate the hot gas streak from the combustion section 26. For example, the contour 130A of the hot side 128A of the first inner endwall 102A of the first turbine nozzle section 96A extends farther into the core air flowpath 37 than the contour 130B of the hot side 128B the second inner endwall 102B of the second turbine nozzle section 96B. More particularly, the contour 130A of the hot side 128A of the first inner endwall 102A of the first turbine nozzle section 96A extends farther into the core air flowpath 37 along the radial direction R than the contour 130B of the hot side 128B of the second inner endwall 102B of the second turbine nozzle section 96B.

Moreover, as is also depicted in FIGS. 3 and 4, each of the first, second, and third turbine nozzle sections 96A, 96B, 96C include a first, second, and third outer endwall 104A, 104B, 104C, respectively. Referring first, however, to the outer endwalls 104 (referred to generally as "104") the outer endwalls 104 together define a flowpath surface 124 along the circumferential direction C. The flowpath surface 124 defines in part the core air flowpath 37. As with the inner endwalls 102, the flowpath surface 124 defined by the outer endwalls 104 defines a contour in the circumferential direction C, as well as along the axial direction A. Referring specifically to a portion of the contour extending along the circumferential direction C, the contour is non-axisymmetric and further repeats less frequently than once per turbine nozzle section 96. For example, as discussed above, the exemplary turbine nozzle sections 96 of the turbine nozzle stage 92 depicted is configured to accommodate four hot gas streaks from the combustion section 26. Accordingly, although the turbine nozzle stage 92 includes 12 turbine nozzle sections 96, the contour defined by the flowpath surface 124 repeats only four times. Again, of course, in other exemplary embodiments, the turbine nozzle stage 92 may include any other suitable number of turbine nozzle sections 96, and may accommodate any other suitable number of hot gas streaks (i.e., the contour defined by the flowpath surface 120 may repeat any other suitable number of times). Additionally, in other exemplary embodiments, the contour defined by the flowpath surface 120 may not repeat at all and may include different configurations at each of the anticipated locations for the hot gas streaks.

As with the inner endwalls 102 described above, one such repeating section of the contour of flowpath surface 124 defined by the outer endwalls 104 includes the first turbine nozzle section 96A, the second turbine nozzle section 96B, and the third turbine nozzle section 96C. The outer endwalls 104A, 104B, 104C of the nozzle sections 96A, 96B, 96C each include a hot side 132A, 132B, 132C having a respective contour along an entirety of the respective hot sides 132A, 132B, 132C. Specifically, for the embodiment illustrated, the hot sides 132A, 132B, 132C include contours 134A, 134B, 134C, respectively, along the circumferential direction C. The first turbine nozzle section 96A is located circumferentially within the first turbine nozzle stage 92 where an anticipated hot streak will occur. In order to accommodate such hot streak, the first, second, and third turbine nozzle sections 96A, 96B, 96C are each manufactured such that the contours extending along the entireties of the hot sides 132A, 132B, 132C of the outer endwalls 104A, 104B, 104C are distinct. Specifically, for the embodiment depicted, the nozzle sections 96A, 96B, 96C are each manufactured such that the contour 134A of the first outer endwall 104A is distinct from the contour 134B of the second outer endwall 104B, which is in turn distinct from the contour 134C of the third outer endwall 102C.

Specifically for the embodiment depicted, the first outer endwall 104A is manufactured to include an additional material 129 added to a base material 131 to allow the first outer endwall 104A to accommodate the hot gas streak from the combustion section 26. For example, the contour 134A of the hot side 132A of the first outer endwall 104A of the first turbine nozzle section 96A extends farther into the core air flowpath 37 than the contour 134B of the hot side 132B the second outer endwall 104B of the second turbine nozzle section 96B. More particularly, a contour 134A of the hot side 132A of the first outer endwall 104A of the first turbine nozzle section 96A extends farther into the core air flowpath 37 along the radial direction R than the contour 134B of the hot side 132B of the second outer endwall 104B of the second turbine nozzle section 96B. It should be appreciated, however, that although the additional material 129 added to the base material 131 of the outer endwalls 102 looks similar to the additional material 129 added to the base material 131 of the inner endwalls 102, in other embodiments, the inner endwalls 102 may define a different contour/shape than the outer endwalls 104.

Figure 5:
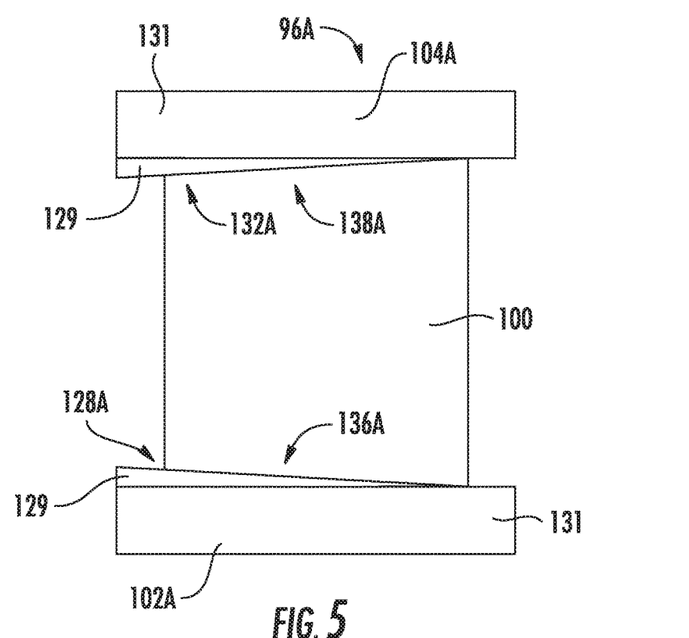
FIG. 5 provides a side, cross-sectional view of a first nozzle section of the exemplary turbine nozzle stage of FIG. 4, taken along Line 5-5 in FIG. 4.
Figure 6:
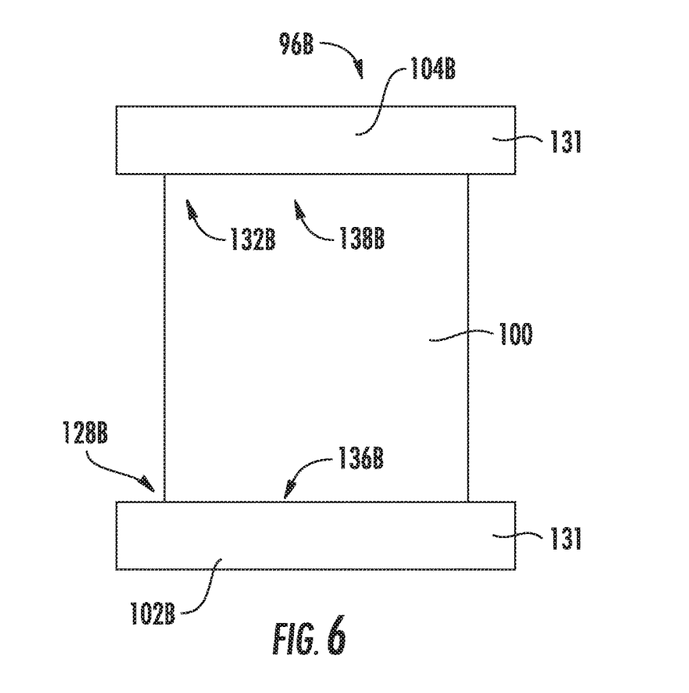
FIG. 6 provides a side, cross-sectional view of a second nozzle section of the exemplary turbine nozzle stage of FIG. 4, taken along Line 6-6 in FIG. 4.

Furthermore, referring now to FIGS. 5 and 6, at least certain adjacent nozzle sections 96 in the stage 92 additionally include distinct contours along a hot side of their respective walls along the axial direction A (in addition to along the circumferential direction C). More particularly, FIG. 5 provides a side, cross-sectional view of the first turbine nozzle section 96A of FIG. 4, along Line 5-5; and FIG. 6 provides a side, cross-sectional view of the second turbine nozzle section 96B of FIG. 4, along Line 6-6.

As is depicted, the first inner and outer endwalls 102A, 104A of the first turbine nozzle section 96A each include a contour 136A, 138A along the axial direction A and along the hot sides 128A, 132A. Similarly, the second inner and outer endwalls 102B, 104B of the second turbine nozzle section 96 each also include a contour 136B, 138B along the axial direction A and along the hot sides 128B, 132B. The contours 136A, 136B of the first turbine nozzle section 96A and the contours 136B, 138B of the second turbine nozzle section 96B are all taken from the same relative location of the first and second nozzle sections 96A, 96B along the circumferential direction C. As depicted, the first and second turbine nozzle sections 96A, 96B have been manufactured such that the contours 136A, 138A of the first inner and outer endwalls 102A, 104A of the first turbine nozzle section 96A are distinct from the contours 136B, 138B of the second inner and outer endwalls 102B, 104B of the second turbine nozzle section 96B. More particularly, the first turbine nozzle section 96A has been manufactured to accommodate a hot gas streak flowing therethrough. Specifically, for the embodiment depicted, the first inner and outer endwalls 102A, 104A of the first turbine nozzle section 96A are manufactured to include an additional material 129 added to a base material 131 to accommodate a hot gas streak flowing therethrough. It should be appreciated, however, that although the additional material 129 added to the base material 131 of the outer endwalls 102 looks similar to the additional material 129 added to the base material 131 of the inner endwalls 102, in other embodiments, the inner endwalls 102 may define a different contour/shape than the outer endwalls 104.

As is discussed in greater detail below with reference to the exemplary flowchart provided in FIG. 7, in at least certain exemplary embodiments, the geometry of the first inner endwall 102A of the first turbine nozzle section 96A may be manufactured at least in part using an additive manufacturing process. More particularly, in certain exemplary aspects, each of the plurality of nozzle sections 96 may be manufactured by casting a base part (including endwalls 102A, 104A having a hot side 128A, 132A with a base contour), and the first inner and outer endwalls 102A, 104A of the first turbine nozzle section 96A may undergo additional manufacturing to customize such part for the particular circumferential position of such part in the first turbine nozzle stage 92. For example, the first inner and outer endwalls 102A, 104A of the first turbine nozzle section 96A may be cast as the base part, and then may additionally be manufactured using an additive manufacturing process (also known as rapid prototyping, rapid manufacturing, and 3D printing) to generate a desired contour for the hot side 128A, 132A for the first inner and outer endwalls 102A, 104A. For example, in certain exemplary aspects, the first inner endwall 102A, 104A of the first turbine nozzle section 96A may be manufactured in part using selective laser sintering (SLS), direct metal laser sintering (DMLS), electron beam melting (EBM), diffusion bonding, or selective heat sintering (SHS).

Notably, the other nozzle sections 96 may also be manufactured in a similar manner, or alternatively may simply be cast as a base part, with the geometry of the base part being a final desired geometry. Additionally, in still other exemplary embodiments, each of the plurality of nozzle sections 96 may be cast such that the base part defines a desired contour/geometry for the component section(s) anticipated as being exposed to the hot gas streaks. The remaining components may then be machined down from the base part to a desired contour/geometry.

It should also be appreciated that in other embodiments, the turbine component stage described as the first turbine nozzle stage 92 with FIGS. 3 through 6 may alternatively be the second turbine nozzle stage 94, or when the turbine component stage is incorporated into other gas turbine engines, any other suitable turbine nozzle stage. Further, in still other exemplary embodiments, the turbine component stage described as the first turbine nozzle stage 92 with FIGS. 3 through 6 may alternatively be the first turbine rotor stage (such that the walls of the turbine components are configured as the platforms 116 of the turbine rotor blades 110), or for embodiments including a plurality of stages of turbine rotor blades, any other stage of turbine rotor blades.

Moreover, although the turbine component stage described above with reference to FIGS. 3 through 6 is described as being configured as part of an HP turbine 28 of a turbofan engine 12, in other embodiments, the turbine component stage may be incorporated into any other turbine included within a given gas turbine engine (e.g., an LP turbine). In one or more of these exemplary embodiments, an endwall (or platform) of the turbine component section may additionally include one or more film cooling holes machined or otherwise formed into the endwall (or platform). As a complement to the differing contours between the various component sections, the endwall (or platform) of the component sections may define different placements (e.g., different sizes, shapes, orientations, etc.) for the plurality of cooling holes, depending on the particular contour.

Further still, in other exemplary embodiments, the component walls of the turbine components may not be configured as inner or outer endwalls 104, and instead may be configured as a seal 106 of the respective turbine components. For example, the seals 106 of the turbine nozzle sections 96 may include contours for accommodating hot gas streaks from the combustion section 26, such that a flowpath surface defined by the seals 106 of the plurality of turbine nozzle sections 96 define a contour in the circumferential direction C that repeats less frequent than once per turbine nozzle section 96.

Furthermore, it should be appreciated that the exemplary turbofan engine 12 described herein is provided by way of example only, and that in other exemplary embodiments, aspects of the present disclosure may be incorporated into a turbofan engine having any other suitable configuration. Further, in still other exemplary embodiments, aspects of the present disclosure may be incorporated into any other suitable gas turbine engine. For example, in other exemplary embodiments, aspects of the present disclosure may be incorporated into, e.g., a turboprop engine, a turboshaft engine, or a turbojet engine. Further, in still other embodiments, aspects of the present disclosure may be incorporated into any other suitable turbomachine, including, without limitation, a steam turbine, a centrifugal compressor, and/or a turbocharger.

Figure 7:
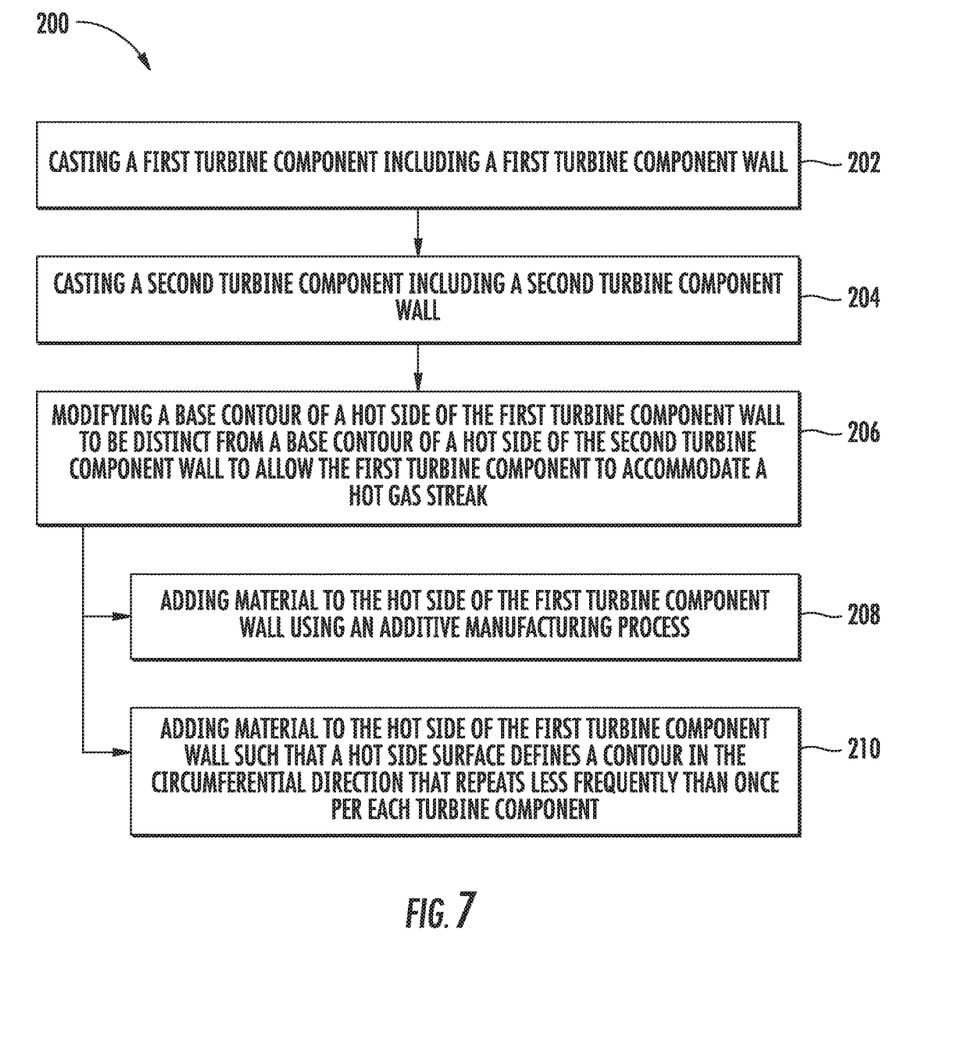
FIG. 7 provides a flowchart of a method for manufacturing a turbine component stage in accordance with an exemplary aspect of the present disclosure.

Referring now to FIG. 7, a flow diagram of a method (200) for manufacturing two or more turbine components in accordance with an exemplary aspect of the present disclosure is provided. More particularly, the exemplary method (200) may be configured for manufacturing two or more components of a turbine component stage of a turbine of a gas turbine engine. The gas turbine engine may in certain exemplary aspects be configured in substantially the same manner as exemplary turbofan engine 12 described above with reference to FIGS. 1 and 2. Accordingly, the turbine of the gas turbine engine may define in part the core air flowpath.

The exemplary method (200) includes at (202) casting a first turbine component including a first turbine component wall. The first turbine component wall may include a hot side defining in part the core air flowpath when installed in the gas turbine engine. The hot side of the gas turbine component wall defines a base contour along a circumferential direction of the gas turbine engine. The exemplary method (200) additionally includes at (204) casting a second turbine component including a second turbine component wall. The second turbine component wall also includes a hot side defining in part the core air flowpath when installed. The hot side of the second turbine component wall additionally defines a base contour along the circumferential direction C. The base contour of the hot side of the first turbine component wall is the same as the base contour of the hot side of the second turbine component wall.

Moreover, referring still to FIG. 7, the exemplary method (200) additionally includes at (206) modifying the base contour of the hot side of the first turbine component wall to accommodate a hot gas streak through the turbine when installed in the gas turbine engine. For the exemplary aspect depicted, modifying the base contour of the hot side of the first turbine component wall at (206) includes at (208) adding material to the hot side of the first turbine component wall. For example, in certain exemplary aspects, adding material to the hot side of the first turbine component wall at (208) may include adding material to the hot side of the first turbine component wall using an additive manufacturing process.

Further, for the exemplary aspect of FIG. 7, the turbine component stage comprises a plurality of turbine components, the plurality of turbine components together defining a substantially continuous flowpath surface defining in part the core air flowpath. The flowpath surface defines a contour in the circumferential direction. The contour repeats less frequent than once per each turbine component. Accordingly, for the aspect depicted, adding material to the hot side of the first turbine component wall at (208) includes adding material to the hot side of the first turbine component wall such that the flowpath surface defines a contour in the circumferential direction (and/or axial direction) the repeats less frequently than once per each turbine component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining an axial direction and a circumferential direction, the gas turbine engine comprising:
   a compressor section;
   a combustion section including a combustion chamber and a number of fuel nozzles for injecting a fuel-air mixture into the combustion chamber; and
   a turbine section, the compressor section, combustion section and turbine section arranged in serial flow order and together at least partially defining a core air flowpath, the turbine section comprising a turbine component stage, the turbine component stage comprising a plurality of turbine components together comprising a radially inner flowpath surface and a radially outer flowpath surface along the circumferential direction, the radially inner flowpath surface and radially outer flowpath surface each defining in part the core air flowpath and each further defining a contour comprising a plurality of different shapes in the circumferential direction, the contour defined by the radially inner flowpath surface repeating a number of times equal to the number of fuel nozzles of the combustion section, and the contour defined by the radially outer flowpath surface also repeating a number of times equal to the number of fuel nozzles of the combustion section.

2. The gas turbine engine of claim 1, wherein each of the plurality of turbine components comprise a wall and a turbine nozzle attached to or formed integrally with the wall, wherein the walls of each of the turbine components comprise a hot side, and wherein the radially inner flowpath surface extends along the hot sides of the walls along the circumferential direction between the respective turbine nozzles.

3. The gas turbine engine of claim 2, wherein the walls are manufactured at least in part using an additive manufacturing process.

4. The gas turbine engine of claim 1, wherein the plurality of turbine components comprises:
   a first turbine component comprising a first wall, the first wall comprising a first hot side and defining in part the core air flowpath, the first wall manufactured to include a contour defining a first shape on the first hot side along the circumferential direction; and
   a second turbine component arranged adjacent to the first turbine component along the circumferential direction, the second turbine component comprising a second wall, the second wall comprising a second hot side and defining in part the core air flowpath, the second wall also manufactured to include a contour defining a second shape on the second hot side, the first shape of the first wall being distinct from the second shape of the second wall to accommodate a hot gas streak from the combustion section.

5. The gas turbine engine of claim 4, wherein the contour of the first hot side of the first wall is defined along the circumferential direction, and wherein the contour of the second hot side of the second wall is also defined along the circumferential direction.

6. The gas turbine engine of claim 5, wherein the contour on the first hot side of the first wall and the contour on the second hot side of the second wall are each located at the same position along the axial direction.

7. The gas turbine engine of claim 4, wherein the turbine component stage is a turbine nozzle stage, wherein the first turbine component is a first turbine nozzle section, and wherein the second turbine component is a second turbine nozzle section.

8. The gas turbine engine of claim 7, wherein the first wall is a first endwall of the first turbine nozzle section, and wherein the second wall is a second endwall of the second turbine nozzle section.

9. The gas turbine engine of claim 7, wherein the first turbine nozzle section is a first combustor discharge nozzle section, and in the second turbine nozzle section is a second combustor discharge nozzle section.

10. The gas turbine engine of claim 4, wherein the first wall is configured as a first rim seal, and wherein the second wall is configured as a second rim seal.

11. The gas turbine engine of claim 1, wherein the turbine component stage is a stage of turbine rotor blades, wherein the first turbine component is a first turbine rotor blade, wherein the second turbine component is a second turbine rotor blade, wherein a first wall is a first platform of the first turbine rotor blade, and wherein a second wall is a second platform of the second turbine rotor blade.

12. The gas turbine engine of claim 1, wherein each of the plurality of turbine components comprise an inner endwall, an outer endwall, and a turbine nozzle attached to or formed integrally with the inner endwall and outer endwall, wherein the inner endwalls and outer endwalls of each of the turbine components each comprise a hot side, wherein the radially inner flowpath surface extends along the hot sides of the inner endwalls along the circumferential direction between the respective turbine nozzles, and wherein the radially outer flowpath surface extends along the hot sides of the outer endwalls along the circumferential direction between the respective turbine nozzles.

13. The gas turbine engine of claim 12, wherein the inner contours and outer contours are each located at the same position along the axial direction.

14. A gas turbine engine defining an axial direction and a circumferential direction, the gas turbine engine comprising:
   a compressor section;
   a combustion section; and
   a turbine section, the compressor section, combustion section and turbine section arranged in serial flow order and together at least partially defining a core air flowpath, the turbine section comprising a turbine component stage, the turbine component stage comprising a plurality of turbine components together comprising a radially inner flowpath surface extending along the circumferential direction and a radially outer flowpath surface extending along the circumferential direction, the radially inner flowpath surface and radially outer flowpath surface each defining in part the core air flowpath, the radially inner flowpath surface further defining an inner contour comprising a plurality of different shapes in the circumferential direction and the radially outer flowpath surface further defining an outer contour also comprising a plurality of different shapes in the circumferential direction, the inner contour and outer contour each repeating less frequently than once per turbine component and more frequently than once per turbine component stage.

\* \* \* \* \*